Dec. 19, 1961  L. CASALONE-RINALDI  3,013,939
FILTERING ELEMENT
Filed March 9, 1960
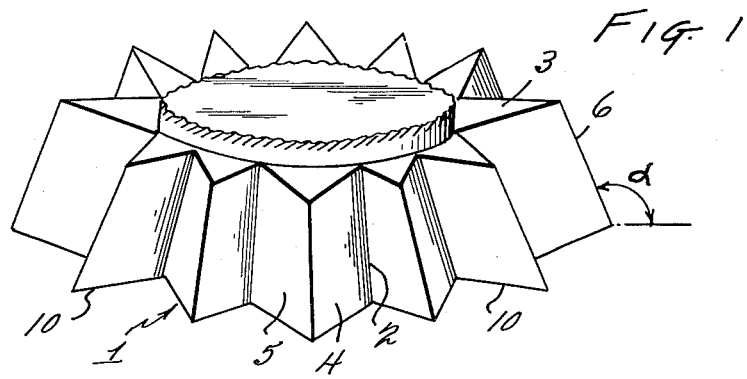
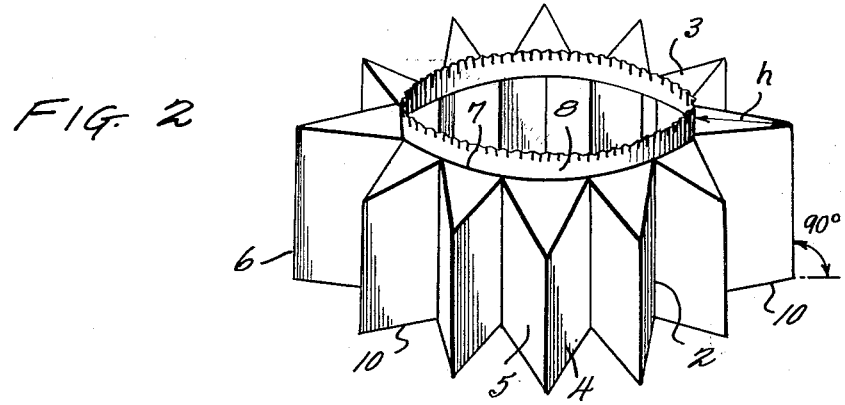
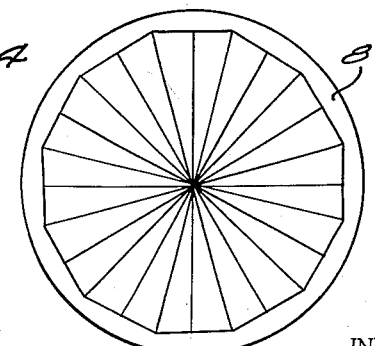
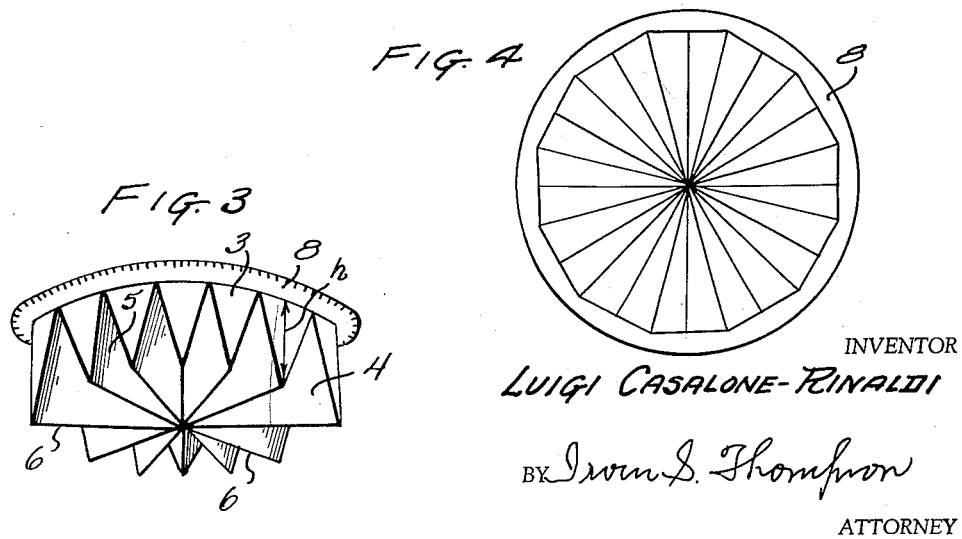
INVENTOR
LUIGI CASALONE-RINALDI
BY Irvin S. Thompson
ATTORNEY United States Patent Office 3,013,939
Patented Dec. 19, 1961

3,013,939
FILTERING ELEMENT
Luigi Casalone-Rinaldi, Turin, Italy, assignor to
Cartiera Italiana S.p.A.
Filed Mar. 9, 1960, Ser. No. 13,865
Claims priority, application Italy Mar. 18, 1959
6 Claims. (Cl. 162—223)

This invention relates to a filtering element for fluids in general, comprised of a mass of felted natural or synthetic fibres, and to a method for its manufacture starting from a suspension of said fibres and using a suitably shaped porous mold.

By varying the kind and the size of the fibres used, said filtering elements can be utilized for eliminating particles of variable size, dispersed in the fluid to be filtered.

Presently, the filtering cartridges comprising synthetic or natural fibres can be substantially subdivided into three classes, namely:

(1) Filtering elements consisting of a disorderly mass of fibres which may or may not be treated with resins. Their greatest disadvantage is a variable filtering capacity which varies from one area of the filter to another, whereby upon exhaustion there will result in the filter preferential passages for the fluids being filtered without any progressive increase of load losses, with the consequent risk of the filter not being replaced in due time.

(2) Filtering elements obtained by various pleating processes from a sheet previously manufactured from natural or synthetic fibres. Although being very efficient, these filtering elements suffer from the disadvantage of a comparatively high cost, inasmuch as the filtering element proper must be either inserted into special containers of metal or plastic material, which cannot be re-used, or at least anchored by suitable means to sealing and stiffening flanges.

(3) Filtering elements obtained by deposit of natural or synthetic fibres on a porous mold and having a surface which cannot be developed in a plane. After molding, the pre-form is folded by rather complex pleating processes, causing it to take a volume as small as possible. Since it is feasible to impart to the felted structure a certain stiffness, as well as to directly form the attachment and sealing flange therein, these filtering elements are considerably less expensive.

The filter cartridge in accordance with this invention belongs to the last-mentioned class of filters, but it differs from the constructions proposed hitherto, because of its particular shape, the ease of pleating the pre-formed filter in its final form of minimum volume, as well as its greater filtering surface by equal volume.

It has been practically proved that it is impossible to obtain a regular and uniform deposit of fibres from a dispersion on a mold having too deep depressions with respect to the gap between the surfaces defining such depressions. Hence the impossibility of forming filtering elements in their ultimate shape by other means than reducing their active surface so as to sufficiently space apart the surfaces for deposit of the fibres.

The present invention provides a filtering element which can be formed in a geometrically extended position, thus avoiding the disadvantages mentioned above, and which —by turning over around its base circumference—makes it possible to obtain a starlike structure having a large filtering surface enclosed within a minimum volume.

FIGURES 1 to 4 of the accompanying drawing diagrammatically show the various shaping steps of the filtering element in accordance with this invention.

FIGURE 1 is a perspective view of the pre-formed filtering element, as obtained by depositing the fibres suspended in a liquid—on a porous, suitably shaped mold, in a machine of known construction. The filter element may be dried with hot air before being removed from the mold, or a separate drying step can be provided, after removal from the mold.

As it can be seen from the drawing, the preformed element—closed or not closed at the top and open at the bottom—comprises a structure formed by teeth consisting of triangular prisms 1 disposed in a star-like arrangement and connected to one another at their radial edges 2. Each prismatic element has three walls, i.e. a triangular base wall 3 and two side walls 4, 5, connected to one another along the edge 6. The various prismatic elements are united at the edge 7 of their triangular base by a rim 8, having a polygonal contour (with a number of sides corresponding to that of the prisms), which in the limit case may be circular. The rim 8 is smooth at the base united to the prismatic elements, whereas at the top it has a slightly corrugated configuration, which will enable it to be deformed in the subsequent overturning step, with increase of its diameter, so as to form the attachment flange of the filtering element.

The central portion 9 (if any), which occupies the surface defined by the corrugated edge of the rim 8 and is united thereto, is removed, after drying, by hollow-punching.

It should be noted that the prisms 1, comprising the filtering unit, in order to make easy both moulding and removing of the piece, may be formed with different orientation, that is to say, the angle between a horizontal base plane and the edge 6 of the prisms may vary and take any intermediate value between 90° and 180°.

During the subsequent processing step, by rotation of the elements 1 around the polygonal line (or circumference) formed by the edges 7 and delimiting the rim 8 in the lower part, said angle is brought to take the value of 90°. This step is illustrated in FIGURE 2, from which it can be seen that the lower perimeter of the piece lies in a plane.

Said perimeter is then impregnated to a suitable height (for instance, 2 mm.) by dipping into a container filled with a suitable glue.

While continuing the rotation around the polygonal line (or circumference) 7—7 . . . 7 which defines the rim 8 at its lower end, a complete overturning is accomplished towards the center and inwardly (causing the angle to vary progressively from 90° to 0°), so as to bring in register—on the axis of the filtering structure— the parts impregnated with glue of the lower perimeter, i.e. the edges 10 of the prisms. This final step is shown in perspective view and in plan view in FIGURE 3 and FIGURE 4, respectively.

By holding forcibly the body in this position, the glue brings about consolidation of the assembly and perfect sealing of the central opening.

The rim 8 takes then the form of a circular crown, whose outer circumference, formed by the inner edge of the initial structure (FIG. 1), has been allowed to extend by virtue of the corrugation obtained in the molding step. The rim 8 may subsequently be stretched, bent, or, for instance, made concave by means of suitable operations, in order to impart thereto the most functional profile to serve as attachment flange of the filtering element.

As it will be apparent from the mode of manufacture described above, the diameter of the circumference circumscribed to the finished filtering element is equal to the diameter of the circumference circumscribed to the polygonal line defined by the sides 7 forming the base of the rim 8, and obviously corresponds to twice the length of the edges 2 or 6 of the triangular prisms. The height of the finished piece is determined by the height $h$ (FIG. 2) of the base 3 of the triangular prisms.

It is to be understood that the operations of moulding, drying, hollow-punching, impregnation of the lower edge of the piece and subsequent rotation or overturning inwardly may be rendered fully automatic with equipment of known type, and repeated in a cycle.

In the example, the filtering structure is shown with a circular perimeter, but it is understood that it may have any shape other than circular, e.g. rectangular or any other.

What I claim is:

1. A method for the manufacture of a filtering element of felted fibers, comprising the steps of depositing said fibers from a suspension on a porous mold which is shaped so as to obtain an initial structure consisting of a large number of elements in the form of triangular prisms disposed in a star-like arrangement, connected to one another at their radial edges and further united in at one edge of the triangular base by an inner rim; drying of the structure so obtained; impregnating with glue the outer lower perimeter of the piece thus formed, and turning the structure inwardly and towards the center by rotation around the base of the inner rim, whereby the edges of the free lower perimeter of the structure are brought in contact at the axis of the structure and fixed in this position by the glue which impregnates them, while the inner rim forms an outer circular crown which serves as an attachment flange of the filtering structure.

2. A method as defined in claim 1, characterized in that the inner rim, which unites the various prismatic elements of the structure to the polygonal base, is formed with its upper portion slightly corrugated, whereby it can extend and increase its diameter upon the subsequent turning step.

3. A method as defined in claim 1, characterized in that the radial edges of the initial structure form an angle of from 90° to 180° with the horizontal plane.

4. A method according to claim 1 in which said filtering element is manufactured from natural fibers.

5. A method according to claim 1 in which said filtering element is manufactured from synthetic fibers.

6. A method according to claim 1 in which in turning said structure inwardly towards the center each triangular prism is rotated substantially 90°.

References Cited in the file of this patent

UNITED STATES PATENTS

| | | |
|---|---|---|
| 2,298,980 | Sloan | Oct. 13, 1942 |
| 2,749,265 | Fricke | June 5, 1956 |
| 2,801,009 | Bowers | July 30, 1957 |